(12) United States Patent
Ma et al.

(10) Patent No.: US 8,922,746 B2
(45) Date of Patent: Dec. 30, 2014

(54) LIQUID CRYSTAL INJECTION DEVICE AND LIQUID CRYSTAL CONTAINER THEREOF

(75) Inventors: Tao Ma, Guangdong (CN); Hyojung Park, Guangdong (CN); Tao Ding, Guangdong (CN); Ming Liu, Guangdong (CN); Tao Song, Guangdong (CN); Guodong Zhao, Guangdong (CN)

(73) Assignee: Shenzhen China Star Optoelectronics Technology Co., Ltd, Guangdong (CN)

( * ) Notice: Subject to any disclaimer, the term of this patent is extended or adjusted under 35 U.S.C. 154(b) by 0 days.

(21) Appl. No.: 13/704,205

(22) PCT Filed: Sep. 4, 2012

(86) PCT No.: PCT/CN2012/080979
§ 371 (c)(1),
(2), (4) Date: Dec. 13, 2012

(87) PCT Pub. No.: WO2014/023052
PCT Pub. Date: Feb. 13, 2014

(65) Prior Publication Data
US 2014/0036217 A1    Feb. 6, 2014

(30) Foreign Application Priority Data
Aug. 6, 2012  (CN) .......................... 2012 1 0277143

(51) Int. Cl.
*G02F 1/1339* (2006.01)
*G02F 1/1341* (2006.01)

(52) U.S. Cl.
CPC ............ *G02F 1/1341* (2013.01); *G02F 1/1301* (2013.01); *G02F 2001/13415* (2013.01)
USPC ........................................................ 349/154

(58) Field of Classification Search
USPC ........................................................ 349/154
See application file for complete search history.

(56) References Cited

U.S. PATENT DOCUMENTS

| 4,966,300 | A  | * | 10/1990 | Coonradt ...................... 220/707 |
| 6,844,908 | B2 |   | 1/2005  | Kim |
| 7,686,442 | B2 |   | 3/2010  | Katsumura |
| 2003/0212337 | A1 | * | 11/2003 | Sirokman ...................... 600/529 |
| 2009/0169717 | A1 | * | 7/2009  | Wen et al. .......................... 427/8 |

FOREIGN PATENT DOCUMENTS

| CN | 1833870 | 9/2006 |
| CN | 101246286 | 8/2008 |
| CN | 101581593 | 11/2009 |
| CN | 201964932 | 9/2011 |
| CN | 102343314 | 2/2012 |
| JP | 5216002 | 8/1993 |
| JP | 2002122875 | 4/2002 |

\* cited by examiner

*Primary Examiner* — Lucy Chien
(74) *Attorney, Agent, or Firm* — Kirton McConkie; Evan R. Witt

(57) ABSTRACT

A liquid crystal (LC) injection device is disclosed in the present invention and includes an LC container, a transporting pipe, a filter and an LC extractor. An inner wall of a bottom in the LC container is a concave shape. The transporting pipe is disposed within the LC container and contacted the inner wall of the bottom in the LC container. The present invention also discloses an LC container. The present invention is to increase the utilization efficiency of the LC container, decrease the LCs waste and enhance the accuracy of the measurement of the remaining LC quantity in the LC bottle.

12 Claims, 3 Drawing Sheets

LIQUID CRYSTAL INJECTION DEVICE AND LIQUID CRYSTAL CONTAINER THEREOF

FIELD OF THE INVENTION

The present invention relates to a field of liquid crystal (LC) display manufacturing technique, and more particularly relates to an LC injection device and an LC container thereof.

BACKGROUND OF THE INVENTION

In the manufacturing process of the liquid crystal (LC) display panel, a One Drop Fill technique is conventionally used to fill the LCs into the LC display panel. The technique can combine the LC filling and the substrate sealing in one operation. Therefore, the LC filling efficiency and the product yield in the mid and large size LC display panel is greatly increased.

The One Drop Fill technique described above is conventionally accomplished by an LC injection device. As shown in FIG. 1, the operative principle of the conventional LC injection device is: LCs 105 are stored in an LC bottle 101. An LC pump 104 will extract the LCs 105 within the LC bottle 101 through a transporting pipe 102 and the LCs 105 are filtered by a filter 103. Thereafter, the LCs 105 are filled into the LC display panel (not shown). A remaining LC quantity detecting sensor 106 is disposed near the bottom of the LC bottle 101 and is utilized for detecting the remaining LC quantity within the LC bottle 101. When the remaining LC quantity detecting sensor 106 detects the remaining LC quantity within the LC bottle 101 is below a predetermined level, it is required to change the LC bottle 101.

In the LC injection device described above, the LCs 105 within the LC bottle 101, which is lower than the detective level of the remaining LC quantity detecting sensor 106, cannot be used, so the utilization efficiency of the LCs 105 within the LC bottle 101 is lower, as a result, the LCs are wasted.

In order to efficiently use the LCs 105 within the LC bottle 101 in the LC injection device, the current solution is: the remaining LCs in multiple LC bottles are collected and retrieved in one LC bottle, and the impurities quantity and LC resistivity thereof are detected. If the requirements are satisfied, the LCs can be reused after bubbles removing.

However, in the LC injection device described above, one time utilization efficiency of the LCs 105 is lower and the replacing frequency of the LC bottle 101 is higher. Therefore, it is necessary to shut down the machine and the production capacity is affected. In addition, according to the solution described above, the remaining LCs in many LC bottles are collected and retrieved in one LC bottle, but a certain amount of the LCs cannot be collected in this process, as a result, the LCs are wasted.

Moreover, in the LC injection device described above, the bottle body of the LC bottle 101 is colored or non-transparency. Therefore, when the remaining LC detecting sensor 106 disposed near the bottom of the LC bottle 101 is going to detect the remaining quantity of the LCs 105 within the LC bottle 101 from the outside of the LC bottle 101, the interruption is caused by the color of the LC bottle 101, and a wrong detection result is obtained. In addition, because the relative position of the remaining LC detecting sensor 106 with respect to the LC bottle 101 is not fixed, the remaining LC detecting sensor 106 may also detects a wrong detection result when the relative position of the remaining LC detecting sensor 106 with respect to the LC bottle 101 is changed. In the two conditions described above, the wrong detection result detected by the remaining LC detecting sensor 106 could cause the LC bottle 101 fails to be replaced in time and the LC pump 104 cannot output the LCs 105, so the LC display panel, which is required to be filled with the LCs 105, is invalid or required to be reworked.

Therefore, it is necessary to provide a novel technique to solve the problem described above.

SUMMARY OF THE INVENTION

An object of the present invention is to provide a liquid crystal (LC) injection device to enhance the utilization efficiency of the LC container and reduce the replacing frequency of the LC container so as to reduce LC waste.

For achieving the above-mentioned resolution, the present invention proposes an LC injection device including: an LC container for storing LCs; a transporting pipe for transporting the LC and the transporting pipe includes a first pipe section and a second pipe section; a filter for filtering impurities in the LCs, and the filter including an input end and an output end, and the first pipe section is connected with the input end and the second pipe section is connected with the output end; an LC extractor for pumping the LCs from the LC container via the transporting pipe and outputting the LCs; an inner wall of a bottom in the LC container being a concave shape; the inner wall of the bottom in the LC container being provided with a cavity; and the device further including: a sensor for detecting a remaining LC quantity within the LC container and sending out a notice when the remaining LC quantity within the LC container is smaller than a predetermined level.

As the LC injection device described above, the first pipe section includes a first pipe end and a second pipe end and the second pipe section includes a third pipe end and a fourth pipe end, and the first pipe end of the first pipe section is disposed within the cavity of the LC container, the second pipe end of the first pipe section is connected with the input end of the filter, the third pipe end of the second pipe section is connected with the output end of the filter and the fourth pipe end of the second pipe section is connected with the LC extractor.

As the LC injection device described above, a minimum inscribed circle radius of a cross section of the cavity is larger than or equal to a circumscribed circle radius of the cross section of the first pipe end.

As the LC injection device described above, the first pipe section includes a detecting zone and a pipe diameter in the detecting zone of the first pipe section is larger than the pipe diameter in an area outside of the detecting zone of the first pipe section, the detecting zone of the first pipe section is transparent or partially transparent, the sensor is disposed near the detecting zone and utilized for detecting if bubbles existed in the detecting zone and send out a notice when the bubbles are detected.

As the LC injection device described above, the sensor is an ultrasonic air bubble detecting sensor, a radar air bubble detecting sensor or an infrared ray air bubble detecting sensor.

Another object of the present invention is to provide an LC injection device to increase the utilization efficiency and reduce the replacing frequency of the LC container so as to reduce LC waste.

For achieving the above-mentioned resolution, the present invention proposes an LC injection device, comprising: an LC container for storing LCs; a transporting pipe for transporting the LCs and including a first pipe section and a second pipe section; a filter for filtering impurities in the LCs, and the filter including an input end and an output end, and the first pipe section is connected with the input end and the second pipe section is connected with the output end; an LC extractor for pumping the LCs from the LC container via the transporting pipe and outputting the LCs; an inner wall of a bottom in the LC container being a concave shape.

As the LC injection device described above, the inner wall of the bottom in the LC container is provided with a cavity.

As the LC injection device described above, the first pipe section includes a first pipe end and a second pipe end and the second pipe section includes a third pipe end and a fourth pipe end, and the first pipe end of the first pipe section is disposed within the cavity of the LC container, the second pipe end of the first pipe section is connected with the input end of the filter, the third pipe end of the second pipe section is connected with the output end of the filter and the fourth pipe end of the second pipe section is connected with the LC extractor.

As the LC injection device described above, a minimum inscribed circle radius of a cross section of the cavity is larger than or equal to a circumscribed circle radius of the cross section of the first pipe end.

As the LC injection device described above, the first pipe end of the transporting pipe includes at least one gap.

As the LC injection device described above, the LC injection device further includes a sensor utilized for detecting a remaining LC quantity within the LC container and send out a notice when the remaining LC quantity within the LC container is smaller than a predetermined level.

As the LC injection device described above, the first pipe section includes a detecting zone and a pipe diameter in the detecting zone of the first pipe section is larger than the pipe diameter in an area outside of the detecting zone of the first pipe section, the detecting zone of the first pipe section is transparent or partially transparent, the sensor is disposed near the detecting zone and utilized for detecting if bubbles existed in the detecting zone and send out a notice when the bubbles are detected.

As the LC injection device described above, the sensor is an ultrasonic air bubble detecting sensor, a radar air bubble detecting sensor or an infrared ray air bubble detecting sensor.

Another object of the present invention is to provide an LC container to increase the utilization efficiency and reduce the replacing frequency of the LC container so as to reduce LC waste.

For achieving the above-mentioned resolution, the present invention proposes an LC container, and an inner wall of a bottom in the LC container is a concave shape.

As the LC container described above, the inner wall of the bottom in the LC container is provided with a cavity.

The above-mentioned description of the present invention can be best understood by referring to the following detailed description of the preferred embodiments and the accompanying drawings.

DETAILED DESCRIPTION OF THE PREFERRED EMBODIMENTS

In the following detailed description of the preferred embodiments, reference is made to the accompanying drawings which form a part hereof, and as shown by way of illustration specific embodiments in which the invention may be practiced.

Figure 1:
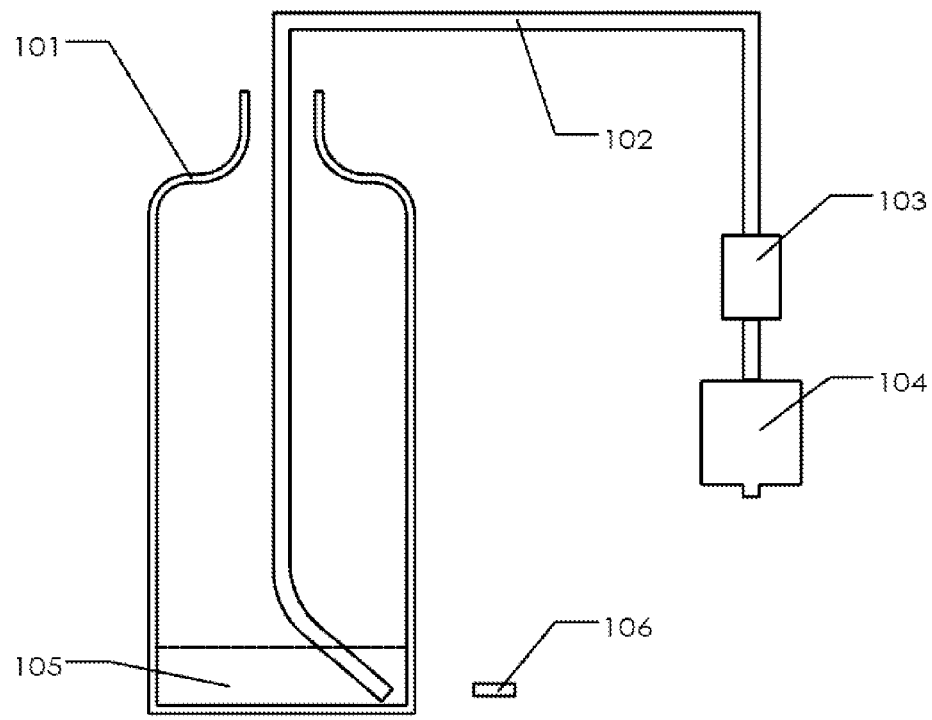
FIG. 1 is a view illustrating a conventional liquid crystal (LC) injection device.
Figure 2:
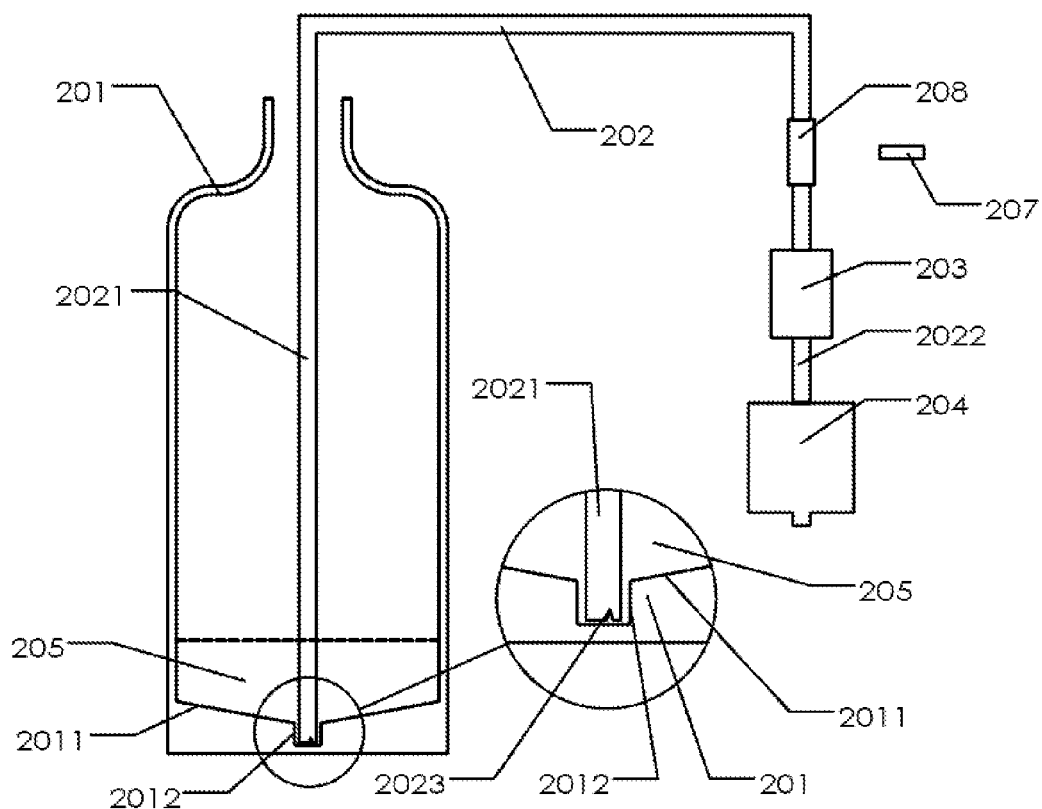
FIG. 2 is a view illustrating an LC injection device in a first preferred embodiment of the present invention.

Please refer to FIG. 2, which is a view illustrating a liquid crystal (LC) injection device in a first preferred embodiment of the present invention. In the present embodiment, the LC injection device in the present invention includes: an LC container, a transporting pipe 202, a filter 203 and an LC extractor. In the present embodiment, the LC container is an LC bottle 201, and the LC extractor is an LC pump 204. The LC bottle 201 is utilized for storing LCs 205 extracted by the LC pump 204. The transporting pipe 202 is utilized for transporting the LCs 205. The transporting pipe 202 includes a first pipe section 2021 and a second pipe section 2022. The filter 203 is utilized for filtering the impurities within the LCs 205, which are transported by the transporting pipe 202. The filter 203 includes an input end and an output end. The first pipe section 2021 of the transporting pipe 202 is connected with the input end and the second pipe section 2022 of the transporting pipe 202 is connected with the output end. In addition, the second pipe section 2022 of the transporting pipe 202 is also connected with the LC pump 204. The LC pump 204 is utilized for extracting the LCs 205 from the LC bottle 201 via the transporting pipe 202 and outputting the LCs 205. Practically, the LCs 205 extracted by the LC pump 204 are filled into the LC display panel (not shown).

The inner wall 2011 of the bottom in the LC bottle 201 is a concave shape. Practically, the concave direction of the inner wall of the bottom in the LC bottle 201 is the direction where the top of the LC bottle directs to the bottom. The lowest position at the inner wall of the bottom in the LC bottle 201 is located in any positions on the inner wall of the bottom, such as at the center of the inner wall of the bottom. The inner wall of the bottom can be a slope, a curve surface or any combination thereof.

The lowest position at the inner wall 2011 of the bottom in the LC bottle 201 is provided with a cavity 2012 and the cavity 2012 is utilized for disposing the LCs 205 and a pipe end of the transporting pipe 202. When the remaining quantity of the LCs 205 within the LC bottle 201 is lower, the remaining quantity of the LCs 205 within the LC bottle 201 will gather in the cavity 2012 because the position of the cavity 2012 is lower than any other positions of the inner wall 2011 of the bottom in the LC bottle 201. Therefore, the LCs 205 can flow from the pipe end of the cavity 2012 into the transporting pipe 202.

The first pipe section 2021 of the transporting pipe 202 includes a first pipe end and a second pipe end. The first pipe end is disposed within the cavity 2012 of the LC bottle 201. A minimum inscribed circle radius of a cross section of the cavity 2012 is larger than or equal to a circumscribed circle radius of the cross section of the first pipe end. The second pipe end is connected with the output end of the filter 203. The second pipe section 2022 of the transporting pipe 202 includes a third pipe end and a fourth pipe end. The third pipe end is connected with the output end of the filter 203 and the fourth pipe end is connected with the LC pump 204. The minimum inscribed circle radius of a cross section of the cavity 2012 is larger than or equal to a circumscribed circle radius of the cross section of the first pipe end. Therefore, the first pipe end of the first pipe section can be completely entered within the cavity 2012. Moreover, the first pipe end can contact the bottom of the cavity 2012 to extract more LCs 205 by the LC pump, so the LCs 205 within the LC bottle 201 can be fully utilized.

According to a modification in the present embodiment, the first pipe end of the transporting pipe 202 includes a gap 2023. Therefore, the edge of the first pipe end is completely attached to the bottom of the cavity 2012 and the LCs 205 gathered within the cavity 2012 can flow from the first pipe end into the transporting pipe 202. The LC pump 204 can extract the LCs 205 within the cavity 2012 as much as possible and the LCs 205 within the LC bottle 201 can be fully utilized. In order to avoid the gap 2023 of the pipe end is too close to the side wall of the cavity 2012 and the LCs 205 cannot flow into the transporting pipe 202, the edge of the pipe orifice in the first pipe end is a saw-toothed shape. Therefore, the LCs 205 can flow into the surrounding area of the pipe orifice in the first pipe end.

In the LC injection device in the present invention, because the inner wall 2011 of the bottom in the LC bottle 201 is a concave shape and the cavity 2012 is disposed in the lowest position of the inner wall 2011 of the bottom of the LC bottle 201, in order to detect the remaining quantity of the LCs 205 in the LC bottle 201, the conventional remaining LC quantity detecting sensor cannot be used to detect the remaining quantity of the LCs 205 in the bottom of the LC bottle 201. The reason is that the thickness in the bottom of the LC bottle 201, which is close to the bottle body, is larger and would shelter or interrupt the remaining LC quantity detecting sensor and the remaining LC quantity detecting sensor cannot detect the accurate value. In order to solve the technique problems described above, the solution in the present invention is:

In the present embodiment, the LC injection device in the present invention further includes a sensor 207 and the sensor 207 is utilized for detecting the remaining quantity of the LCs 205 in the LC bottle 201. If the remaining quantity of the LCs 205 in the LC bottle 201 is lower than the predetermined level, the sensor 207 will send out a notice or warning. Practically, the first pipe section includes a detective zone 208 and the detective zone 208 is partially transparent or transparent. The sensor 207 is disposed near the detective zone 208 and faced to the transparent portion of the detective zone 208. Therefore, it is advantageous for the sensor 207 to detect bubbles from the transparent detective zone 208. In the present embodiment, the sensor 207 can be a sensor selected from an ultrasonic air bubble detecting sensor, a radar air bubble detecting sensor and an infrared ray air bubble detecting sensor and so on and utilized for detecting if bubbles are existed in the detective zone 208 of the first pipe section. Therefore, because the flowing speed of the bubbles in the detective zone 208 with larger pipe diameter is slower than in the pipe section with smaller pipe diameter, the sensor 207 can precisely detect the bubbles therein, when the bubbles are existed in the detective zone 208.

Figure 3:
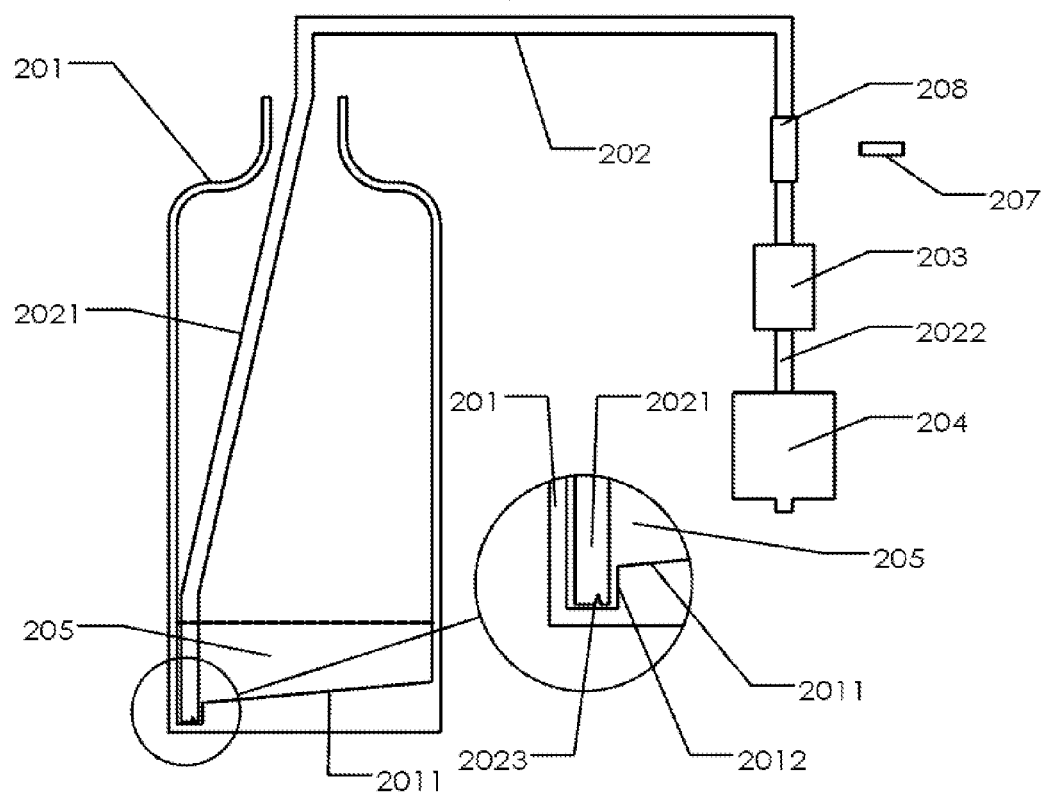
FIG. 3 is a view illustrating an LC injection device in a second preferred embodiment of the present invention.

Please refer to FIG. 3, which is a view illustrating the LC injection device in a second preferred embodiment of the present invention. In the present embodiment, the LC injection device in the present invention includes an LC container, a transporting pipe 202, a filter 203 and an LC extractor. In the present embodiment, the LC container is an LC bottle 201, and the LC extractor is an LC pump 204. The LC bottle 201 is utilized for storing and providing LCs 205. The transporting pipe 202 is utilized for transporting the LCs 205 and includes a first pipe section 2021 and a second pipe section 2022. The filter 203 is utilized for filtering the impurities within the LCs 205, which is transported by the transporting pipe 202. The filter 203 includes an input end and an output end. The first pipe section 2021 of the transporting pipe 202 is connected with the input end and the second pipe section 2022 of the transporting pipe 202 is connected with the output end. In addition, the second pipe section 2022 of the transporting pipe 202 is also connected with the LC pump 204. The LC pump 204 is utilized for extracting the LCs 205 from the transporting pipe 202 and the LC bottle 201 and outputting the LCs 205. Practically, the LCs 205 extracted by the LC pump 204 is filled into the LC display panel (not shown). The first pipe section 2021 of the transporting pipe 202 includes a first pipe end and a second pipe end. The first pipe end is disposed within the LC bottle 201. The second pipe end is connected with the output end of the filter 203. The second pipe section 2022 of the transporting pipe 202 includes a third pipe end and a fourth pipe end. The third pipe end is connected with the output end of the filter 203 and the fourth pipe end is connected with the LC pump 204.

The inner wall 2011 of the bottom in the LC bottle 201 is a concave shape. Practically, the concave direction of the inner wall 2011 of the bottom in the LC bottle 201 is the direction where the top of the LC bottle 201 directs to the bottom. The lowest position of the inner wall of the bottom in the LC bottle 201 is located in any positions on the inner wall of the bottom, such as at the edge of the inner wall of the bottom. The inner wall of the bottom can be a slope, a curve surface or any combination thereof.

The lowest position in the inner wall 2011 of the bottom of the LC bottle 201 is provided with a cavity 2012 and the cavity 2012 is utilized for disposing the LCs 205 and a pipe end of the transporting pipe 202. When the remaining quantity of the LC 205 within the LC bottle 201 is lower, the remaining quantity of the LCs 205 within the LC bottle 201 will gather in the cavity 2012 because the position of the cavity 2012 is lower than any other position of the inner wall 2011 of the bottom in the LC bottle 201. Therefore, the LCs 205 can flow from the pipe end of the cavity 2012 into the transporting pipe 202. The first pipe end is disposed within the cavity 2012 of the LC bottle 201 and the minimum inscribed circle radius of a cross section of the cavity 2012 is larger than or equal to a circumscribed circle radius of the cross section of the first pipe end. Therefore, the first pipe end of the first pipe section can be completely entered within the cavity 2012. Furthermore, the first pipe end can contact the bottom of the cavity 2012 to extract more LCs 205 by the LC pump 204 and the LCs 205 within the LC bottle 201 can be fully utilized.

According to a modification in the present embodiment, the first pipe end of the transporting pipe 202 includes a gap 2023. Therefore, the edge of the first pipe end is completely attached to the bottom of the cavity 2012 and the LCs 205 gathered within the cavity 2012 can flow from the first pipe end into the transporting pipe 202. The LC pump 204 can extract the LCs 205 within the cavity 2012 as much as possible and the LCs 205 within the LC bottle 201 can be fully utilized. In order to avoid the gap 2023 of the pipe end is too close to the side wall of the cavity 2012 and the LCs 205 cannot flow into the transporting pipe 202, the edge of the pipe orifice of the first pipe end is a saw-toothed shape. Therefore, the LCs 205 can flow into the surrounding area of the edge of the pipe orifice of the first pipe end.

In the LC injection device of the present invention, because the inner wall 2011 of the bottom in the LC bottle 201 is a concave shape and the cavity 2012 is disposed in the lowest position of the inner wall 2011 of the bottom of the LC bottle 201, in order to detect the remaining quantity of the LCs 205 in the LC bottle 201, the conventional remaining LC quantity detecting sensor cannot be used to detect the remaining quantity of the LCs 205 in the bottom of the LC bottle 201. The reason is that the thickness in the bottom of the LC bottle 201, which is close to the bottle body, is larger and would shelter or interrupt the remaining LC quantity detecting sensor and the remaining LC quantity detecting sensor cannot detect the accurate value. In order to solve the technique problems described above, the solution in the present invention is:

In the present embodiment, the LC injection device in the present invention further includes a sensor 207 and the sensor 207 is utilized for detecting the remaining quantity of the LCs 205 in the LC bottle 201. If the remaining quantity of the LCs 205 in the LC bottle 201 is lower than the predetermined level, the sensor 207 will send out a notice or warning. Practically, the first pipe section includes a detective zone 208 and the detective zone 208 is partially transparent or transparent. The sensor 207 is disposed near the detective zone 208 and faced to the transparent portion of the detective zone 208. Therefore, it is advantageous for the sensor 207 to detect bubbles from the transparent detective zone 208. In the present embodiment, the sensor 207 can be a sensor selected from an ultrasonic air bubble detecting sensor, a radar air bubble detecting sensor and an infrared ray air bubble detecting sensor and so on and utilized for detecting if bubbles are existed in the detective zone 208 of the first pipe section. In the first pipe section, the pipe diameter in the detective zone 208 is larger than the pipe diameter in any other areas. Therefore, because the flowing speed of the bubbles in the detective zone 208 with larger pipe diameter is slower than in the pipe section with smaller pipe diameter, the sensor 207 can precisely detect the bubbles therein when the bubbles are existed in the detective zone 208.

According to the LC container in the present invention, as shown in FIG. 2 and FIG. 3, the LC container is the LC bottle 201 and the inner wall of the bottom in the LC bottle 201 is a concave shape. Practically, the concave direction of the inner wall 2011 of the bottom in the LC bottle 201 is the direction where the top of the LC bottle 201 directs to the bottom. The lowest position of the inner wall of the bottom in the LC bottle 201 is located in any positions on the inner wall of the bottom, such as at the center of the inner wall of the bottom. The inner wall of the bottom can be a slope shape, a curved shape or any combination thereof.

In the LC bottle of the present invention, the lowest position in the inner wall 2011 of the bottom in the LC bottle 201 includes a cavity 2012 and the cavity 2012 is utilized for disposing the LCs 205 and a pipe end of the transporting pipe 202. Especially, when the remaining quantity of the LCs 205 within the LC bottle 201 is lower, the remaining quantity of the LCs 205 within the LC bottle 201 will gather in the cavity 2012 because the position of the cavity 2012 is lower than any other position at the inner wall 2011 of the bottom in the LC bottle 201. Therefore, the pipe pump 204 can extract the LCs 205 by cooperating with the pipe end within the cavity 2012.

In the present invention, because the inner wall 2011 of the bottom in the LC bottle 201 is a concave shape and the cavity 2012 is disposed in the lowest position of the inner wall 2011 within the bottom of the LC bottle 201. When the remaining quantity of the LCs 205 in the LC bottle 201 is lower, the LCs 205 within the LC bottle 201 will gather in the cavity 2012 and the LC pump 204 can completely extract the LCs 205 within the LC bottle 201 with respect to the transporting pipe 202 (one pipe end of the transporting pipe 202 is disposed within the cavity 2012). The LCs 205 within the cavity 2012 can be fully utilized and the replacing frequency of the LC bottle 201 is lower. In addition, the edge of the pipe orifice in the first pipe end of the transporting pipe 202 within the cavity 2012 includes at least one gap 2023. Therefore, the edge of the pipe orifice in the first pipe end completely attached to the bottom of the cavity 2012 can be avoided to prevent that the LCs 205 gathered within the cavity 2012 can flow from the first pipe end into the transporting pipe 202. The LC injection device in the present invention further includes a sensor 207 and the first pipe section includes a detective zone 208. The sensor 207 is disposed near the detective zone 208 to detect the bubbles therein. Therefore, the sensor 207 can precisely determine the remaining quantity of the LCs 205 within the LC bottle 201. Because the pipe diameter in the detective zone 208 of the first pipe section 2021 is larger than the pipe diameter in any other areas, the flowing speed of the bubble in the detective zone 208 is slower than any other areas when the bubbles are entering in the detective zone. It is advantageous for the sensor 207 to detect the bubbles precisely to get a better detection result.

As described above, the present invention has been described with preferred embodiments thereof and it is understood that many changes and modifications to the described embodiments can be carried out without departing from the scope and the spirit of the invention that is intended to be limited only by the appended claims.

What is claimed is:

1. A liquid crystal (LC) injection device, comprising:
an LC container for storing LCs;
a transporting pipe for transporting the LCs, the transporting pipe including a first pipe section and a second pipe section;
a filter for filtering impurities in the LCs, the filter including an input end and an output end, and the first pipe section being connected with the input end and the second pipe section being connected with the output end;
an LC extractor for pumping the LCs from the LC container via the transporting pipe and outputting the LCs;
an inner wall of a bottom in the LC container being a concave shape;
the inner wall of the bottom of the LC container being provided with a cavity, the cavity is utilized for disposing the LCs and a pipe end of the transporting pipe;
and the device further comprising:
a sensor for detecting a remaining LC quantity within the LC container and transmitting a notice when the remaining LC quantity within the LC container is less than a predetermined level.

2. The LC injection device according to claim 1, wherein the first pipe section includes a first pipe end and a second pipe end and the second pipe section includes a third pipe end and a fourth pipe end, and the first pipe end of the first pipe section is disposed within the cavity of the LC container, the second pipe end of the first pipe section is connected with the input end of the filter, the third pipe end of the second pipe section is connected with the output end of the filter and the fourth pipe end of the second pipe section is connected with the LC extractor.

3. The LC injection device according to claim 2, wherein a minimum inscribed circle radius of a cross section of the cavity is larger than or equal to a circumscribed circle radius of the cross section of the first pipe end.

4. The LC injection device according to claim 3, wherein the first pipe section includes a detecting zone and a pipe diameter in the detecting zone of the first pipe section is larger than the pipe diameter in an area outside of the detecting zone of the first pipe section, the detecting zone of the first pipe section is transparent or partially transparent, the sensor is disposed near the detecting zone and utilized for detecting if bubbles existed in the detecting zone and send out a notice when the bubbles are detected.

5. The LC injection device according to claim 4, wherein the sensor is an ultrasonic air bubble detecting sensor, a radar air bubble detecting sensor or an infrared ray air bubble detecting sensor.

6. A LC injection device, comprising:
an LC container for storing LCs;
a transporting pipe for transporting the LCs, and the transporting pipe including a first pipe section and a second pipe section;
a filter for filtering impurities in the LCs, and the filter including an input end and an output end, and the first pipe section being connected with the input end and the second pipe section being connected with the output end;
an LC extractor for pumping the LCs from the LC container via the transporting pipe and outputting the LCs;
an inner wall of a bottom in the LC container being a concave shape, the inner wall of the bottom in the LC container is provided with a cavity, the cavity is utilized for disposing the LCs and a pipe end of the transporting pipe.

7. The LC injection device according to claim 6, wherein the first pipe section includes a first pipe end and a second pipe end, the second pipe section includes a third pipe end and a fourth pipe end, the first pipe end of the first pipe section is disposed within the cavity of the LC container, the second pipe end of the first pipe section is connected with the input end of the filter, the third pipe end of the second pipe section is connected with the output end of the filter, and the fourth pipe end of the second pipe section is connected with the LC extractor.

8. The LC injection device according to claim 7, wherein a minimum inscribed circle radius of a cross section of the cavity is larger than or equal to a circumscribed circle radius of the cross section of the first pipe end.

9. The LC injection device according to claim 8, wherein the first pipe end of the transporting pipe includes at least one gap.

10. The LC injection device according to claim 6 further comprising:
a sensor for detecting a remaining LC quantity within the LC container and sending out a notice when the remaining LC quantity within the LC container is smaller than a predetermined level.

11. The LC injection device according to claim 10, wherein the first pipe section includes a detecting zone and a pipe diameter in the detecting zone of the first pipe section is larger than the pipe diameter in an area outside of the detecting zone of the first pipe section, the detecting zone of the first pipe section is transparent or partially transparent, the sensor is disposed near the detecting zone and utilized for detecting if bubbles existed in the detecting zone and send out a notice when the bubbles are detected.

12. The LC injection device according to claim 11, wherein the sensor is an ultrasonic air bubble detecting sensor, a radar air bubble detecting sensor or an infrared ray air bubble detecting sensor.

* * * * *